May 5, 1942.　　　　F. S. HAVILL　　　　2,282,185
LOCOMOTIVE TIRE SANDER
Filed Oct. 22, 1941　　　　4 Sheets-Sheet 1
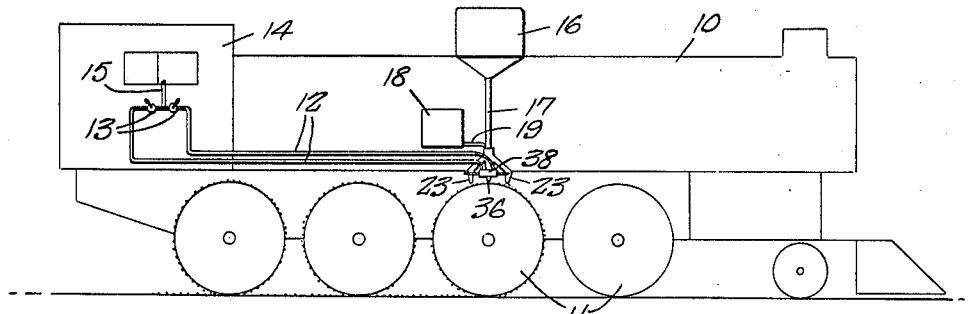
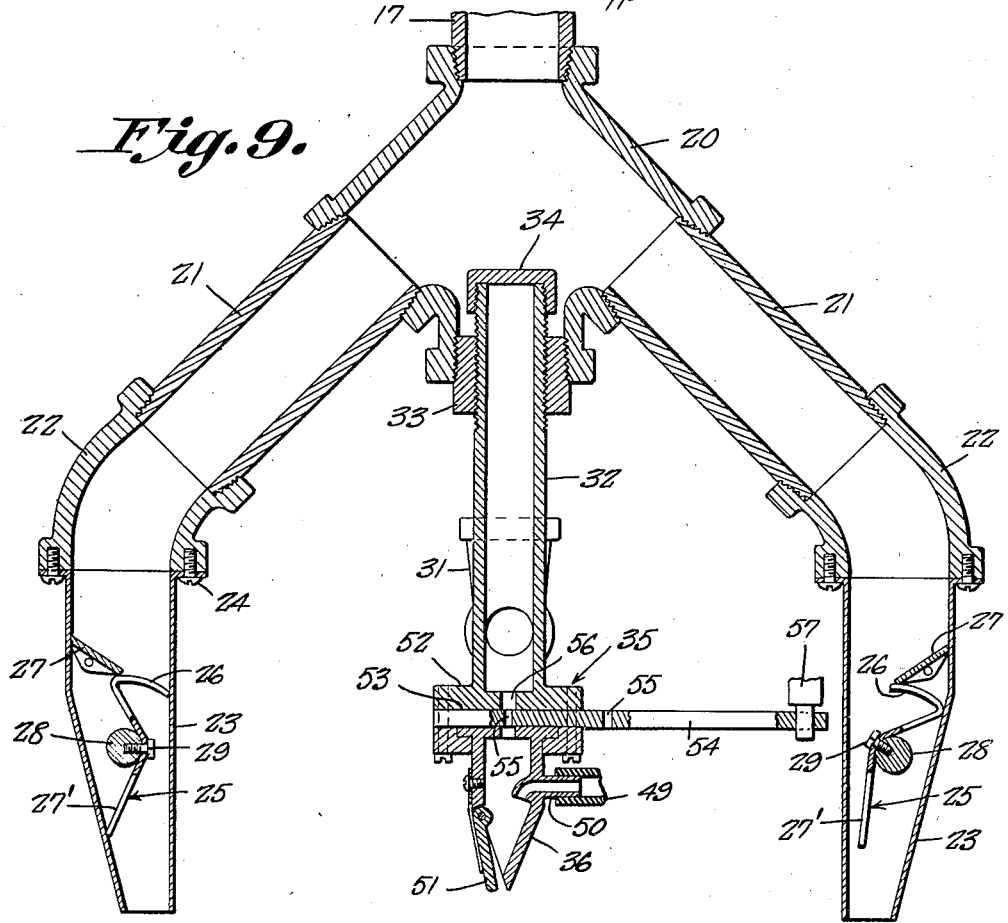
INVENTOR,
Frederick S. Havill.
BY
Victor J. Evans & Co.
ATTORNEYS Frederick S. Havill,
INVENTOR.

May 5, 1942.　　　　F. S. HAVILL　　　　2,282,185
LOCOMOTIVE TIRE SANDER
Filed Oct. 22, 1941　　　　4 Sheets-Sheet 3

Frederick S. Havill,
INVENTOR.

BY
Victor J. Evans & Co.
ATTORNEYS

May 5, 1942. F. S. HAVILL 2,282,185
LOCOMOTIVE TIRE SANDER
Filed Oct. 22, 1941 4 Sheets-Sheet 4
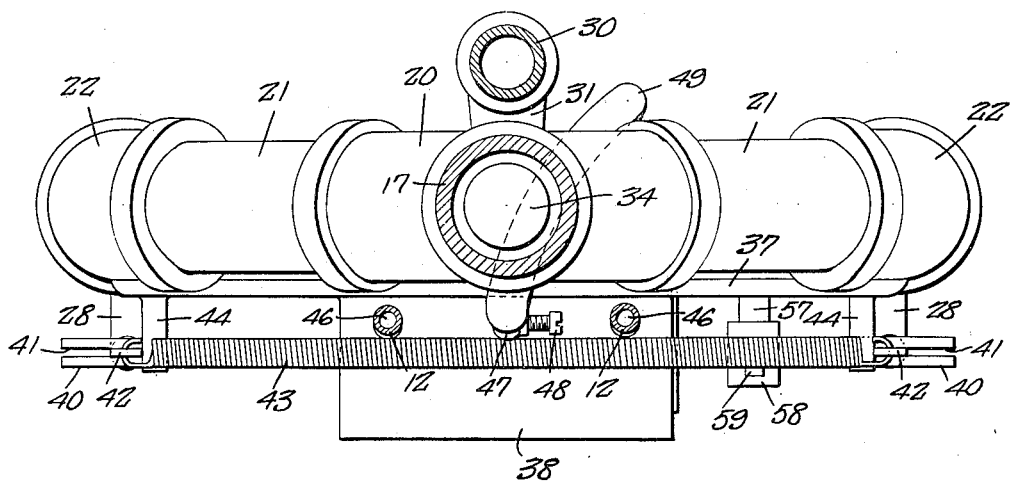
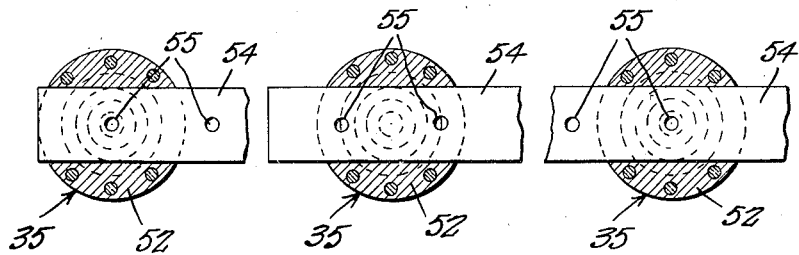
Frederick S. Havill,
INVENTOR.
BY
Victor J. Evans & Co.
ATTORNEYS Patented May 5, 1942

2,282,185

UNITED STATES PATENT OFFICE 2,282,185

LOCOMOTIVE TIRE SANDER

Frederick S. Havill, Halifax, Nova Scotia, Canada

Application October 22, 1941, Serial No. 416,123

3 Claims. (Cl. 291—3)

This invention relates to a locomotive tire sander and has for an object to provide apparatus for applying sand and an adhesive to the tires of locomotive wheels to promote better traction of the wheels and better application of the brakes thereto than hitherto possible where sand alone is applied to the track rails.

A further object is to provide apparatus of this type in which the sand is fed by gravity onto the locomotive wheel tire, that is the rim of the wheel, and liquid adhesive is blown or sprayed on the tire by air under pressure causing the sand to adhere to the tire and eliminate all of the inconveniences and disadvantages of the use of sand on the rails, such as waste, breakage and stoppages in the conventional rail pipes, and other disadvantages.

A further object is to provide apparatus of this character which will be formed of a few strong, simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawings forming a part of this specification:

Figure 1 is a diagrammatic view of a locomotive having a tire sander constructed in accordance with the invention in applied position, the tire sander being shown in side elevation.

Figure 5 is a cross sectional view of the tire sander taken on the line 5—5 of Figure 2 showing the various parts thereof in top plan.

Figures 6, 7 and 8 are diagrammatic views showing three positions of the slide valve which controls the liquid adhesive spray.

Figure 9 is a vertical sectional view of the tire sander taken on the line 9—9 of Figure 4.

Figure 2:
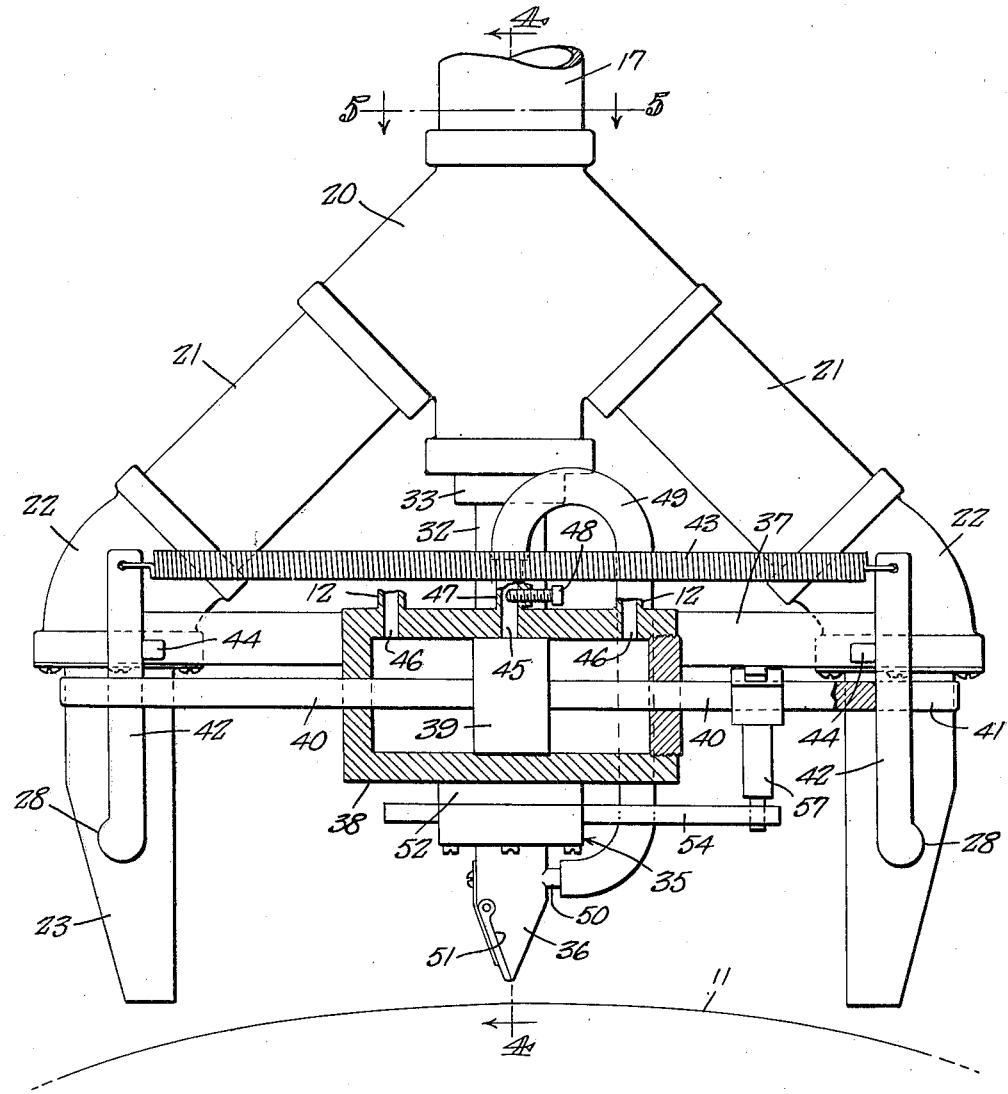
Figure 2 is an enlarged side elevation of the tire sander with the piston cylinder shown in section and showing the piston in neutral position.

Referring now to the drawings in which like characters of reference designate similar parts in the various views, 10 designates a locomotive, 11 the wheels thereof, 12 compressed air supply tubes which are conventional, 13 air valves, which are also conventional and are located in the cab 14, supplied by compressed air through a pipe 15 which is connected to any suitable source of compressed air supply, 16 a sand box which in the present embodiment of the invention is mounted on the locomotive a short distance above the tire sander about to be described, and may be connected thereto by short pipe 17, and 18 designates a tank for a liquid adhesive, an adhesive supply pipe 19 leading from the tank to the tire sander.

There are two tire sanders, applied to intermediate wheels of the locomotive wheels on each side of the locomotive, and since both sanders are duplicates of each other, but one will be now described.

The tire sander according to my invention, comprises a double Y 20 having the vertical branch secured to the sand supply pipe 17. Sand applying pipes 21 are secured to the lateral branches of the double Y, see Figure 9, and the lower ends of the pipes are equipped with elbows 22 to which nozzles 23 are secured by screws 24, or other connectors, engaged through flanges 25 on the nozzles. The sand fills the sand pipes from foot valves in the nozzles to the sand level of the sand box, by gravity.

Each foot valve is provided at the upper end with a horizontal flap 26 which, together with a fixed downwardly inclined plate 27 in the nozzle, forms a closure when the foot valve is closed, in which position of the valve a vertical flap 27' engages one wall of the nozzle below the horizontal flap. The valve itself is substantially V-shaped in contour and at the apex is connected to a respective operating shaft 28 by a set screw 29.

Figure 4:
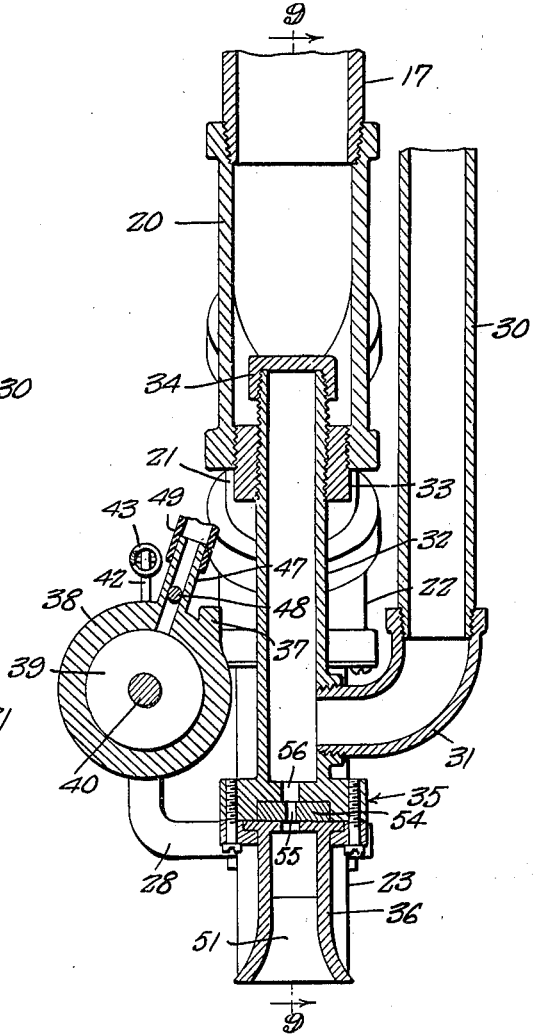
Figure 4 is a vertical sectional view of the tire sander taken on the line 4—4 of Figure 2.

A vertically disposed pipe 30, see Figure 4, is connected at the upper end to the adhesive supply pipe 19. The pipe 30 is equipped with an elbow 31 at the lower end which is engaged in an opening on the rear side of a vertically disposed adhesive applying pipe 32 which enters the double Y through a bushing 33 and is capped within the double Y as shown at 34. The pipe 32 has the dual function of a hanger for supporting a slide valve mechanism 35, and as a liquid adhesive conducting pipe for the slide valve mechanism. Liquid adhesive fills the liquid pipes just described from the slide valve mechanism to the level of the liquid adhesive supply in the tank 18, by gravity.

The two sand nozzles 23 are disposed directly above and spaced slightly from the tire of an intermediate locomotive wheel, see Figure 2, of the four wheels, and a liquid adhesive nozzle 36, carried by the slide valve mechanism 35, is disposed between the two sand nozzles so that the adhesive will be applied to the wheel tire when one of the sand nozzles is used during advance of the locomotive and when the other is used during reverse travel of the locomotive.

Figure 3:
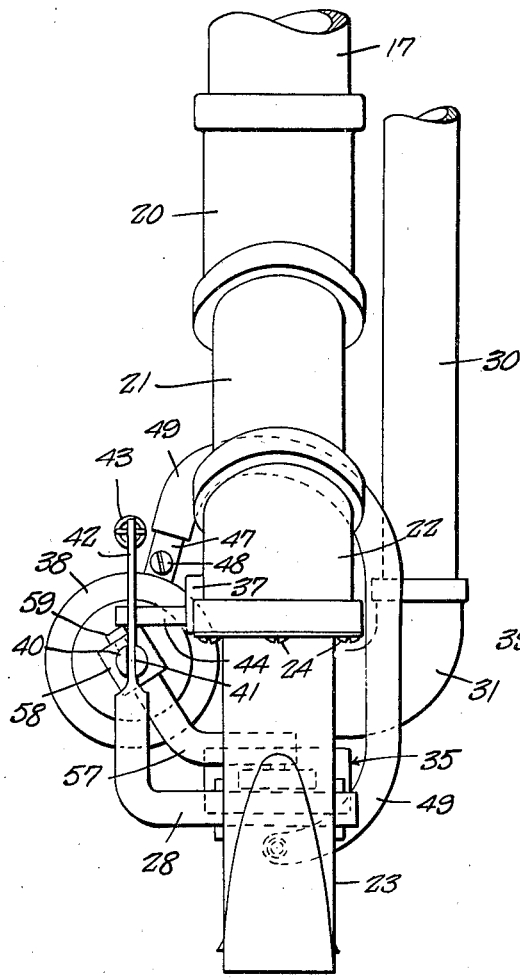
Figure 3 is an end elevation of the tire sander.

By referring to Figures 2, 3 and 4 it will be seen that a bar 37 is secured in horizontal position to the elbows 22 and secured in any preferred manner to the bar is a compressed air cylinder 38 having a piston 39 therein. The piston is provided with aligned piston rods 40 which project through the heads of the cylinder and are provided in the ends with slots 41, see Figure 2, which receive crank arms 42. The crank arms are secured at the lower ends to the shafts 28 of the foot valves 29 in the sand nozzles. Both crank arms are yieldably held in neutral position by a helical spring 43 which is connected to the upper end of both crank arms and tends constantly to hold the crank arms against stop lugs 44 carried by the bar 37 near the ends thereof, see Figures 2 and 3. In this position of the crank arms the piston 39 is in neutral position and seals an exhaust port 45 at the center of the upper side of the cylinder, see Figure 2.

An air admission port 46 is disposed in the upper side of the cylinder near each end thereof and is connected to a respective compressed air supply pipe 12. When either of the control valves 13 is opened in the cab air will be admitted under pressure to a respective end of the cylinder through one of the ports 46 and will move the piston about one inch more or less to rock the respective crank arm 42 and open the respective foot valve 25 to release sand onto the wheel tire. At the same time such movement of the piston uncovers the exhaust port 46 so that air under pressure will pass into an exhaust pipe 47, see Figures 3 and 4, which is controlled by a screw valve 48, see Figure 2. The exhaust pipe is connected by a flexible hose 49 to a nipple 50 which communicates with the adhesive nozzle 36 below the slide valve mechanism, see Figure 9. The exhaust air from the cylinder enters the exhaust nozzle and meets the liquid adhesive metered by the slide valve mechanism and blows the liquid adhesive through a hinged spring pressed door 51 which normally closes the outlet opening of the nozzle. The door is held open by pressure of the compressed air and the liquid adhesive is blown downward onto the tire of the wheel at a point in advance of the selected sand applying nozzle which is being used until the control valve in the cab is shut off to close the foot valve of the sand nozzle and simultaneously move the slide valve mechanism to neutral position as will now be described.

The slide valve mechanism comprises a case 52 having a longitudinal guide opening 53 in which is mounted a slide valve 54 having a pair of spaced ports 55 adapted to be selectively brought into register with a vertical passage 56 in the case which communicates with the aforesaid pipe 32 and with the adhesive nozzle 36 above the nipple 50, see Figure 9. A connecting rod 57, see Figures 2, 3 and 4, is connected at one end to the slide valve 54 and at the other end is fixed to one of the piston rods 40 by a collar 58 and set screw 59. When the piston is moved in either direction on its operating stroke to open a selected sand nozzle foot valve the slide valve 54 will be moved in a corresponding direction and will align one of the ports 55 with the passage 56 to establish flow of the liquid adhesive into the liquid nozzle to be blown out by the compressed air as previously described.

When the piston rod forces one of the vertically disposed crank arms 42 outwardly to open the respective foot valve in a selected sand nozzle, the companion vertically disposed crank arm 42 is not affected since the slot in the respective piston rod merely moves away from the crank arm while the crank arm is still held by the helical spring 43 against its respective stop lug 44.

Since the operation of the parts has been described as the description of the parts progressed it is thought the invention will be fully understood without further explanation.

What is claimed is:

1. A locomotive tire sander comprising, sand pipes for applying sand to the tire, a liquid adhesive supply pipe between the sand pipes, a fluid pressure cylinder and piston, valves in the sand pipes connected to the piston to be selectively opened by movement of the piston, means for conducting the fluid pressure exhaust from the cylinder to the adhesive pipe for blowing the adhesive onto the tire, and means for feeding the adhesive into said exhaust connected to the piston to be actuated by movement of the piston.

2. A locomotive tire sander comprising, sand pipes for applying sand to the tire, a fluid pressure cylinder having inlet ports near the ends and an exhaust port intermediate the inlet ports, valve controlled fluid pressure pipes connected to the inlet ports, aligned piston rods for the piston, valves in the sand pipes connected to respective piston rods to be selectively opened by movement of the piston, a liquid adhesive pipe between the sand pipes, a pipe for conducting the exhaust from the cylinder into the adhesive pipe for blowing the adhesive from the pipe onto the tire when either sand pipe valve is open, and an adhesive metering device in the adhesive pipe above the entrance of the exhaust into the adhesive pipe said metering device being connected to one of the piston rods for admitting adhesive into said exhaust when the piston is actuated.

3. The structure as of claim 2 and in which said metering device comprises a case having a passage formed therein for conducting liquid adhesive through the liquid adhesive pipe, and a slide valve obstructing the passage having spaced ports adapted to selectively register with the passage when a respective sand pipe valve is open.

FREDERICK S. HAVILL.